US012282439B2

(12) United States Patent
Shen et al.

(10) Patent No.: US 12,282,439 B2
(45) Date of Patent: Apr. 22, 2025

(54) DYNAMIC PAGE STATE AWARE SCHEDULING OF READ/WRITE BURST TRANSACTIONS

(71) Applicant: Advanced Micro Devices, Inc., Santa Clara, CA (US)

(72) Inventors: Guanhao Shen, Austin, TX (US); Ravindra N. Bhargava, Austin, TX (US); Kedarnath Balakrishnan, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/100,254

(22) Filed: Nov. 20, 2020

(65) Prior Publication Data

US 2021/0073152 A1 Mar. 11, 2021

Related U.S. Application Data

(63) Continuation of application No. 15/850,751, filed on Dec. 21, 2017, now Pat. No. 10,846,253.

(51) Int. Cl.
*G06F 13/30* (2006.01)
*G06F 3/06* (2006.01)
*G06F 13/16* (2006.01)

(52) U.S. Cl.
CPC ............ *G06F 13/30* (2013.01); *G06F 3/0659* (2013.01); *G06F 3/0673* (2013.01);
(Continued)

(58) Field of Classification Search
CPC ...... G06F 13/30; G06F 3/0659; G06F 3/0673; G06F 3/0679; G06F 13/1626; G06F 13/1642
See application file for complete search history.

(56) References Cited

U.S. PATENT DOCUMENTS 4,980,823 A 12/1990 Liu
5,375,216 A 12/1994 Moyer et al.
(Continued)

OTHER PUBLICATIONS

Non-Final Office Action in U.S. Appl. No. 15/851,087, mailed Dec. 14, 2020, 19 pages.
(Continued)

*Primary Examiner* — Michael Krofcheck
*Assistant Examiner* — Janice M. Girouard
(74) *Attorney, Agent, or Firm* — Kowert, Hood, Munyon, Rankin & Goetzel, P.C.; Rory D. Rankin (57) ABSTRACT

Systems, apparatuses, and methods for performing efficient memory accesses for a computing system are disclosed. When a memory controller in a computing system determines a threshold number of memory access requests have not been sent to the memory device in a current mode of a read mode and a write mode, a first cost corresponding to a latency associated with sending remaining requests in either the read queue or the write queue associated with the current mode is determined. If the first cost exceeds the cost of a data bus turnaround, the cost of a data bus turnaround comprising a latency incurred when switching a transmission direction of the data bus from one direction to an opposite direction, then a second cost is determined for sending remaining memory access requests to the memory device. If the second cost does not exceed the cost of the data bus turnaround, then a time for the data bus turnaround is indicated and the current mode of the memory controller is changed.

20 Claims, 5 Drawing Sheets

(52) U.S. Cl.
CPC ........ *G06F 3/0679* (2013.01); *G06F 13/1626* (2013.01); *G06F 13/1642* (2013.01)

(56) References Cited

U.S. PATENT DOCUMENTS

| | | | |
|---|---|---|---|
| 5,566,324 | A | 10/1996 | Kass |
| 5,754,825 | A | 5/1998 | Hausauer et al. |
| 5,826,052 | A | 10/1998 | Stiles et al. |
| 6,205,516 | B1 | 3/2001 | Usami |
| 6,226,724 | B1 | 5/2001 | Biggs |
| 6,266,742 | B1 | 7/2001 | Challenger et al. |
| 6,292,871 | B1 | 9/2001 | Fuente |
| 6,393,500 | B1 | 5/2002 | Thekkath |
| 6,549,991 | B1 | 4/2003 | Huang et al. |
| 6,564,287 | B1 | 5/2003 | Lee |
| 6,615,325 | B2 | 9/2003 | Mailloux et al. |
| 6,684,294 | B1 | 1/2004 | Huffman |
| 6,957,308 | B1 | 10/2005 | Patel |
| 7,133,995 | B1 * | 11/2006 | Isaac .................. G06F 12/0215 711/204 |
| 7,882,309 | B2 | 2/2011 | Donley |
| 8,073,009 | B2 | 12/2011 | Ching et al. |
| 10,175,893 | B2 | 1/2019 | Bonanno et al. |
| 10,846,253 | B2 | 11/2020 | Shen et al. |
| 2001/0010096 | A1 | 7/2001 | Horton, Jr. et al. |
| 2001/0039602 | A1 | 11/2001 | Kanda et al. |
| 2002/0031020 | A1 | 3/2002 | Ozawa et al. |
| 2003/0204674 | A1 | 10/2003 | Ryan et al. |
| 2005/0021921 | A1 * | 1/2005 | Blackmon ........... G06F 13/1631 711/158 |
| 2006/0182034 | A1 | 8/2006 | Klinker et al. |
| 2006/0224832 | A1 | 10/2006 | So et al. |
| 2009/0138663 | A1 | 5/2009 | Lee et al. |
| 2009/0248994 | A1 * | 10/2009 | Zheng ..................... G06F 13/28 711/E12.001 |
| 2014/0122814 | A1 | 5/2014 | Mirichigni et al. |
| 2014/0372696 | A1 | 12/2014 | Tune et al. |
| 2019/0196996 | A1 | 6/2019 | Balakrishnan et al. |

OTHER PUBLICATIONS

"Synthesizable 143 MHz ZBT* SRAM Interface", XILINX, Inc., XAPP136, Apr. 6, 1999, Version 1.1, 12 pages.
Goudarzi et al., "Object-Aware Cache: Higher Hit-Ratio in Object-Oriented ASIPs", Canadian Conference on Electrical and Computer Engineering, May 2004, pp. 0653-0656.
Halfhill, Tom R., "LSI Logic Wants your SoC", Microprocessor Report, Jun. 12, 2006, 6 pages.
Wang et al., "Guided Region Prefetching: A Cooperative Hardware/Software Approach", Proceedings of the 30th Annual International Symposium on Computer Architecture, Jun. 2003, pp. 388-398.
International Search Report in International Application No. PCT/US03/21286, mailed Dec. 9, 2003, 6 pages.
Non-Final Office Action in U.S. Appl. No. 15/851,087, mailed Feb. 19, 2019, 26 pages.
Final Office Action in U.S. Appl. No. 15/851,087, mailed Jun. 13, 2019, 38 pages.

* cited by examiner

DYNAMIC PAGE STATE AWARE SCHEDULING OF READ/WRITE BURST TRANSACTIONS

Cross Reference to Related Applications

This application is a continuation of U.S. patent application Ser. No. 15/850,751, entitled "DYNAMIC PAGE STATE AWARE SCHEDULING OF READ/WRITE BURST TRANSACTIONS", filed Dec. 21, 2017, the entirety of which is incorporated herein by reference.

BACKGROUND

Description of the Related Art

Memory access latencies for system memory, such as off-chip dynamic random access memory (DRAM), are typically appreciable. To reduce the effect of this latency penalty and taking into account that read operations are on the critical path for program execution, read operations are assigned a higher priority than write operations. When read operations are being serviced, the system memory drives the off-chip data bus. The requested data is sent to the corresponding processing unit via the memory controller. In the meantime, write operations are stored in a write queue in the memory controller.

At a given time, the memory controller determines it is time to switch from sending read operations to sending write operations. The off-chip data bus is turned around so that the memory controller drives the off-chip data bus with write data to the system memory. The bus turnaround latencies from read-to-write and write-to-read operations are also appreciable. However, use of the off-chip data bus is made even more inefficient due to the typical lack of efficient scheduling of read or write operations as the time for a bus turnaround nears. For example, a number of memory accesses targeting a same page reduces as the time for a bus turnaround nears.

In view of the above, efficient methods and systems for performing efficient memory accesses for a computing system are desired.

BRIEF DESCRIPTION OF THE DRAWINGS

The advantages of the methods and mechanisms described herein may be better understood by referring to the following description in conjunction with the accompanying drawings, in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing efficient memory accesses for a computing system are disclosed. In one embodiment, a computing system includes one or more computing resources and external system memory such as one of a variety of types of dynamic random access memory (DRAM). Examples of the computing resources include a general-purpose central processing unit (CPU), a graphics processing unit (GPU), an accelerated processing unit (APU), and so forth. The computing resources generate memory access requests. In various embodiments, a given computing resource includes a cache memory subsystem. When the given computing resource determines a memory access request misses within the cache memory subsystem, the given computing resource sends the memory access request to a given memory controller.

The given memory controller is coupled to a memory device associated with a target address of the memory access request. If the computing system includes multiple memory devices, then the address spaces are distributed among the multiple memory devices by the operating system. The memory controller supports mapping between the request addresses of the computing resources and addresses pointing to storage locations in the memory device(s). In some embodiments, a memory controller is connected to a single memory device. In other embodiments, a memory controller is connected to multiple memory devices.

In various embodiments, the memory controller includes one or more queues for storing memory access requests. In an embodiment, the memory controller includes a read queue for storing memory read requests and a separate write queue for storing memory write requests. In other embodiments, the memory controller includes a unified queue for storing both memory read requests and memory write requests.

In yet other embodiments, the memory controller includes one or more queues for storing received memory access requests and a separate queue for storing scheduled memory access requests selected from the one or more queues. Therefore, the memory controller supports out-of-order issue of the memory access requests to the memory device based on priorities and target addresses. In some embodiments, the memory controller also supports out-of-order issue of the responses to the computing resources based on at least priorities.

In various embodiments, the memory controller includes control and status registers and a control unit with control logic for storing thresholds and other data used for control decisions. The control logic in the memory controller determines which one of a read mode and a write mode is a current mode for the off-chip data bus and the memory device. In an embodiment, each mode has a threshold number of memory access requests to send from the memory controller to the memory device prior to an off-chip data bus turnaround being performed. A data bus turnaround refers to changing a transmission mode of a bus from transmitting in one direction to the other (opposite) direction. For example, when changing from a read mode to a write mode, or vice versa, a data bus turnaround is performed. This threshold number of memory access requests to send is referred to as the "burst length."

In some embodiments, a count of remaining read requests to send is updated when memory read requests are sent from the memory controller to the memory device. The count is incremented or decremented depending on the initial value of the count, which may increment from zero to the threshold number of memory read requests, or read burst length, or alternatively decrement from the read burst length to zero. In various embodiments, a write count is updated in a similar manner based on the initial value of count when memory write requests are sent from the memory controller to the memory device. For sending write requests to the memory device, a write burst length is used.

As used herein, "memory read requests" are also referred to as read requests, and similarly, "memory write requests" are also referred to as write requests. For read requests, the response includes the data requested in the read request. For write requests, the response includes an acknowledgment that the write operation completed. In some embodiments, when a mode of the read mode and the write mode begins and the memory device has responses to send, the responses are sent via the data bus to the memory controller before memory access requests are sent from the queues in the memory controller to the memory device. In other embodiments, the memory bus supports read responses and read requests to be sent at the same time, and a similar transport is supported for write responses and write requests.

When the control logic determines the threshold number of memory access requests, or burst length, has been sent from the memory controller in the current mode, the control logic indicates it is time for a data bus turnaround and changes the current mode to another mode of the read mode and the write mode. For example, when the current mode is a read mode and the control logic determines the threshold number of memory read requests (read burst length) sent from the read queue have been sent, the control logic indicates it is time for a data bus turnaround and changes the current mode of the memory controller from the read mode to the write mode. The latency for the data bus turnaround begins at this time.

When the control logic determines the threshold number of memory access requests have not been sent from the memory controller in the current mode, the control logic determines a first cost for sending remaining requests in a queue associated with the current mode up to the threshold number. The cost corresponds to a latency associated with sending remaining requests up to the threshold number. In various embodiments, to calculate the first cost the control logic determines a number of page conflicts and a number of page misses that will occur within the remaining number of requests up to the threshold number. A latency is associated with each page conflict and page miss. In some embodiments, a weighted sum of the number of page conflicts and page misses is calculated. In various embodiments, the memory device has a default cost for a data bus turnaround (i.e., a latency associated with the bus turnaround from a read or write mode to the other mode). The cost can be measured in time (e.g., nanoseconds) or a number of clock cycles. In some embodiments the cost can be converted from a measure of time to another value for comparison to a weighted sum.

In the present example, the calculated first cost is compared to the cost of the off-chip data bus turnaround. If the first cost does not exceed the cost of the off-chip data bus turnaround, then the control logic continues sending memory access requests (e.g., from the queue) associated with the current mode to the memory device. However, if the first cost does exceed the cost of the off-chip data bus turnaround, then in some embodiments the control logic indicates it is time for a data bus turnaround and changes the current mode of the memory controller, the data bus, and the memory device. In other embodiments, if the first cost exceeds the cost of the off-chip data bus turnaround, then the control logic determines a second cost for sending remaining memory access requests up to the threshold number to the memory device, where the remaining memory access requests may be stored in another read queue or write queue not associated with the current mode. For example, in one embodiment, if the current mode is a read mode then the second cost corresponds to a latency associated with sending a threshold number of write requests from a write queue.

In various embodiments, the second cost is determined in a manner similar to that of the first cost. In other embodiments, the second cost is converted from a minimum value of the current number of outstanding write requests and the threshold number of write requests. If the second cost exceeds the cost of the off-chip data bus turnaround, then the control logic continues sending memory access requests from the queue associated with the current mode to the memory device until the threshold number is reached. Otherwise, the control logic indicates it is time for a data bus turnaround and changes the current mode of the memory controller, the data bus and the memory device.

Figure 1:
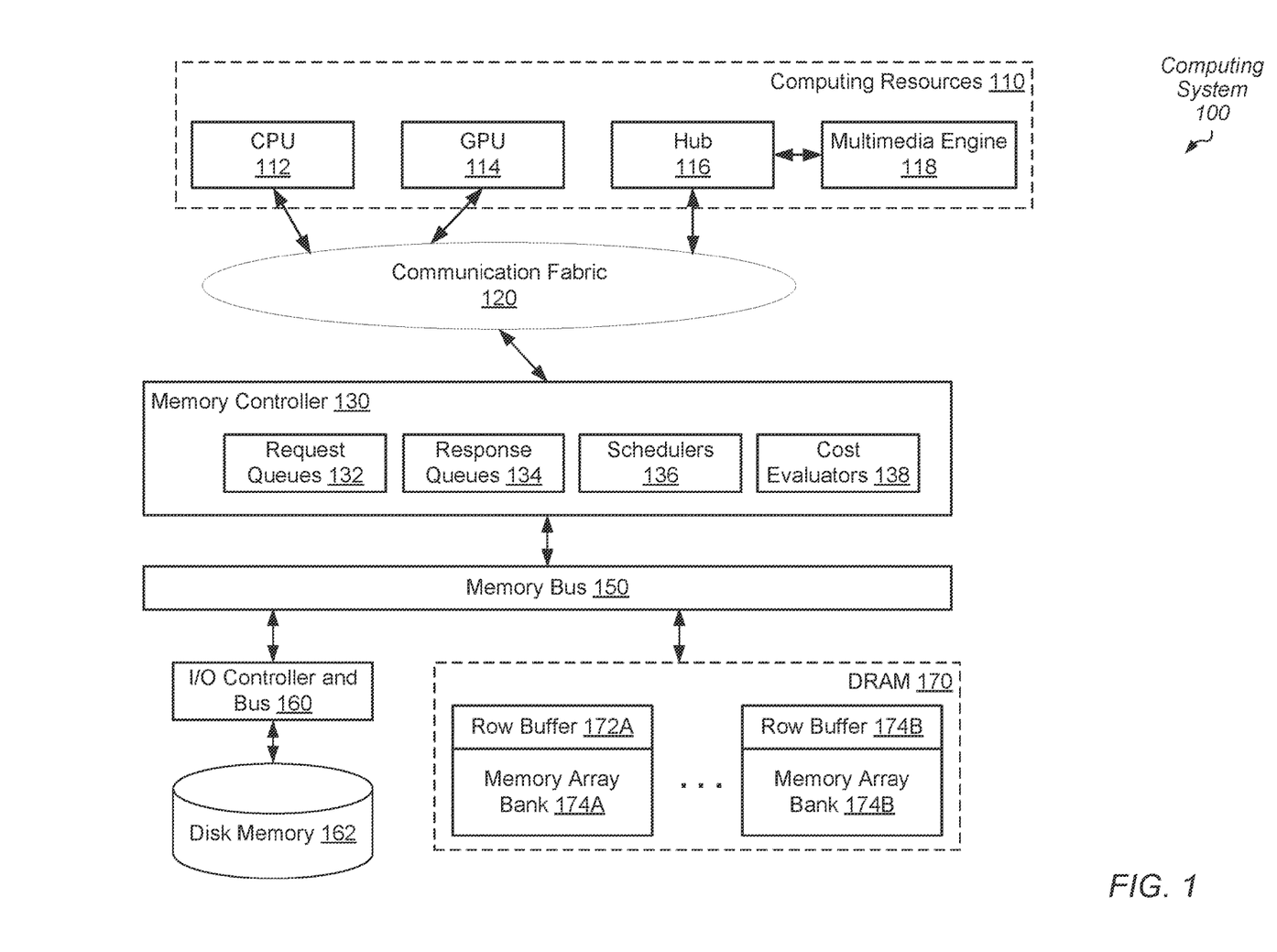
FIG. 1 is a block diagram of one embodiment of a computing system.

Referring to FIG. 1, a generalized block diagram of one embodiment of a computing system 100 is shown. As shown, computing system 100 includes communication fabric 120 between each of memory controller 130 and computing resources 110. In the illustrated embodiment, the computing resources include central processing unit (CPU) 112, graphics processing unit (GPU) 114 and Hub 116. Hub 116 is used for communicating with Multimedia Engine 118. Although a single memory controller 130 is shown, in other embodiments, another number of memory controllers are used in computing system 100. Memory controller 130 receives memory access requests from computing resources 110 via the communication fabric 120 and sends the memory access requests to one or more of off-chip disk memory 162 and system memory, which is implemented as off-chip dynamic random access memory (DRAM) 170. Memory controller 130 also receives responses from DRAM 170 and disk memory 162 and sends the responses to a corresponding source of the request in computing resources 110.

In some embodiments, the components of computing system 100 are individual dies on an integrated circuit (IC), such as a system-on-a-chip (SOC). In other embodiments, the components are individual dies in a system-in-package (SiP) or a multi-chip module (MCM). In one embodiment, computing system 100 is a stand-alone system within a mobile computer, a smart phone, a smartwatch, or a tablet; a desktop; a server; or other. The CPU 112, GPU 114 and Multimedia Engine 118 are examples of computing resources capable of generating memory access requests. Although not shown, in other embodiments, other types of computing resources are included in computing resources 110.

Each of the one or more processor cores in CPU 112 includes circuitry for executing instructions according to a given selected instruction set architecture (ISA). In various embodiments, each of the processor cores in CPU 112 includes a superscalar, multi-threaded microarchitecture used for processing instructions of the given ISA. In an embodiment, GPU 114 includes a high parallel data microarchitecture with a significant number of parallel execution lanes. In one embodiment, the microarchitecture uses single-instruction-multiple-data (SIMD) pipeline for the parallel execution lanes. Multimedia Engine 118 includes processors for processing audio data and visual data for multimedia applications.

In one example, an accelerated processing unit (APU), a display controller, an audio processor, and so forth, are additional candidates to be included in computing resources 110. An example of an APU is a CPU integrated on a same die with a GPU, a FPGA, or other processing unit, thus improving data transfer rates between these units while reducing power consumption. In other embodiments, the APU includes video processing and other application-specific accelerators.

In various embodiments, communication fabric 120 transfers traffic back and forth between computing resources 110 and memory controller 130 and includes interfaces for supporting respective communication protocols. In some embodiments, communication fabric 120 includes at least queues for storing requests and responses, selection logic for arbitrating between received requests before sending requests across an internal network, logic for building and decoding packets, and logic for selecting routes for the packets.

In some embodiments, the address space of the computing system 100 is divided among at least CPU 112, GPU 114 and Hub 116 and one or more other components such as input/output peripheral devices (not shown) and other types of computing resources. Memory maps are maintained for determining which addresses are mapped to which component, and hence to which one of CPU 112, GPU 114 and Hub 116 a memory request for a particular address should be routed.

As software applications access more and more data, the memory subsystem is utilized more heavily. Latencies become more crucial. More on-chip memory storage is used to reduce interconnect latencies. For example, one or more of the computing resources within computing resources 110 include cache memory subsystems to reduce memory latencies for a respective processor core. In addition, in some embodiments, a shared cache memory subsystem is used by the processor cores as a last-level cache (LLC) before accessing the off-chip DRAM 170 and/or the off-chip disk memory 162.

A reduced miss rate is achieved by the additional memory provided by cache memory subsystems and latency gaps are hidden between a given one of the processor cores in computing resources 110 and the off-chip memory. However, because there is limited amount of on-die area to use for cache memory subsystems, a number of memory access requests may still be sent to the off-chip memory (e.g., to the DRAM 170 and/or the disk memory 162.

The cache memory subsystems (not shown) in the computing resources in computing resources 110 include high-speed cache memories configured to store blocks of data. As used herein, a "block" is a set of bytes stored in contiguous memory locations, which are treated as a unit for coherency purposes. As used herein, each of the terms "cache block", "block", "cache line", and "line" is interchangeable. In some embodiments, a block may also be the unit of allocation and deallocation in a cache. The number of bytes in a block is varied according to design choice, and may be of any size. In addition, each of the terms "cache tag", "cache line tag", and "cache block tag" is interchangeable. In various embodiments, the cache memory subsystems are implemented as a hierarchy of caches. As used herein, the term "access" refers to performing a memory read request or a memory write request operation that results in a cache hit if the requested data of a corresponding request address resides in the cache. Alternatively, the memory access request results in a cache miss if the requested data does not reside in the cache.

If a cache miss occurs, then a memory access request is generated and transmitted to the memory controller 130. The memory controller 130 translates an address corresponding to the requested block and sends the memory access request to the off-chip DRAM 170 through the memory bus 150. In various embodiments, the off-chip DRAM 170 is filled with data from the off-chip disk memory 162 through the I/O controller and bus 160 and the memory bus 150. A corresponding cache fill line with the requested block is conveyed from the off-chip DRAM 170 to a corresponding one of the cache memory subsystems in computing resources 110 in order to complete the original memory access request. The cache fill line is placed in one or more levels of caches.

In various embodiments, the off-chip DRAM 170 is a type of dynamic random-access memory that stores each bit of data in a separate capacitor within an integrated circuit. The capacitor can be either charged or discharged. These two states are used to represent the two logical values of a bit. The DRAM 170 utilizes a single transistor and a capacitor per bit. Compared to six transistors used in on-chip synchronous RAM (SRAM), the DRAM reaches higher densities. Unlike HDDs and flash memory, the DRAM 170 is volatile memory, rather than non-volatile memory. The DRAM 170 loses its data relatively quickly when a power supply is removed.

In an embodiment, off-chip DRAM 170 includes a multi-channel memory architecture. This type of architecture increases the transfer speed of data to the memory controller 130 by adding more channels of communication between them. In an embodiment, the multi-channel architecture utilizes multiple memory modules and a motherboard and/or a card capable of supporting multiple channels. In another embodiment, DRAM 170 utilizes three-dimensional integrated circuits (3D ICs) to provide system memory. In such an embodiment, the 3D integrated DRAM provides both low-latency interconnects and a significantly large amount of additional on-chip memory storage to reduce off-chip memory accesses. In various embodiments, DRAM 170 is used as system memory for computing system 100. Other memory technologies for system memory that use a row-based access scheme including one or more row buffers or other equivalent structures are possible and contemplated. Examples of other memory technologies include phase-change memories, spin-torque-transfer resistive memories, memristors, and so forth.

As shown, DRAM 170 includes multiple memory array banks 174A-174B. Each one of the banks 174A-174B include a respective one of the row buffers 172A-172B. Each one of the row buffers 172A-172B stores data in an accessed row of the multiple rows within the memory array banks 174A-174B. The accessed row is identified by a DRAM address in the received memory access request. Control logic within DRAM 170 performs complex transactions such as activation and precharge of data and control lines within DRAM 170 once to access an identified row and once to put back the modified contents stored in the row buffer to the identified row. In various embodiments, DRAM 170 includes one or more memory channels, one or more memory modules or devices per channel, one or more ranks per memory module, one or more banks per rank, and one or more rows per bank. Typically, each row stores a page of data. The size of the page is chosen based on design considerations. The page can be one kilobyte (1 KB), four kilobytes (4 KB), or any size based on design choices.

Accesses of DRAM 170 can be inefficient due to the complex transactions occurring within DRAM 170. The activation stage, precharge stage, switches (i.e., changes) to different banks between adjacent accesses, switches to different ranks between adjacent accesses, and so forth, create significant latencies. In addition, there is a latency associated with a mode switch such as a switch from the read mode to the write mode and vice-versa. At the end of a write cycle, DRAM 170 is actually performing the write operation for the write data into the corresponding one of the data arrays within one of the banks 174A-174B. When adjacent write accesses target a same page (row), the write accesses are efficient and minimize latencies between adjacent accesses.

In contrast to a minimal latency between two write accesses targeting a same page, switches between modes have a significant latency. For example, at the end of the write mode, a write access is followed by a read access, and the read access needs to wait for completion of the write access. In various embodiments, memory bus 150 utilizes a bidirectional shared-bus structure. When a bus driver stops driving information on memory bus 150, the bus driver propagates a glitch on memory bus 150. One or more bus propagation latencies are needed for this glitch to dissipate. Additionally, the communication protocol used by memory bus 150 and DRAM 170 utilizes a data preamble consisting of one or more bus clock cycles. Since data is not transferred during the preamble, the latency of the mode switch grows even more. In some embodiments, the bus propagation time on memory bus 150 is appreciable and it is not hidden during mode switches as it can be hidden during adjacent accesses of a same type. Therefore, the latency of the data bus turnaround can be significant.

One example of a protocol for a respective interface to the memory controller 130 is a double data rate (DDR) type of protocol. The protocol determines values used for information transfer, such as a number of data transfers per clock cycle, signal voltage levels, signal timings, signal and clock phases and clock frequencies. Protocol examples include DDR2 SDRAM, DDR3 SDRAM, GDDR4 (Graphics Double Data Rate, version 4) SDRAM, and GDDR5 (Graphics Double Data Rate, version 5) SDRAM. The memory controller 130 includes control circuitry for interfacing to the memory channels and following a corresponding protocol.

As shown, memory controller 130 includes request queues 132 for queuing memory access requests received from processing units 110 via communication fabric 120. Memory controller 130 also has a response queue 134 for storing responses received from DRAM 170. In an embodiment, request queues 132 include one or more queues for storing memory access requests. In another embodiment, request queues 132 include a read queue for storing memory read requests and a separate write queue for storing memory write requests. In other embodiments, request queues 132 include a unified queue for storing both memory read requests and memory write requests.

In yet other embodiments, request queues 132 include one or more queues for storing received memory access requests and a separate queue for storing scheduled memory access requests selected from the one or more queues. Schedulers 136 include one or more scheduling blocks for selecting memory access requests stored in request queues 132 for out-of-order issue to DRAM 170. Therefore, memory controller 130 supports out-of-order issue of the memory access requests to DRAM 170 based on priorities and target addresses. In some embodiments, memory controller 130 also supports out-of-order issue of the responses to computing resources 110 based on at least priorities. In various embodiments, schedulers 136 in memory controller 130 schedule the issue of the stored memory access requests based on a quality-of-service (QoS) or other priority information, age, a process or thread identifier (ID), and a relationship with other stored requests such as targeting a same memory channel, targeting a same rank, targeting a same bank and/or targeting a same page.

In various embodiments, memory bus 150 supports sending data traffic in a single direction for a given amount of time, such as during a given mode of the read mode and the write mode, and then sends data traffic in the opposite direction for another given amount of time such as during the other mode of the read mode and the write mode. In an embodiment, memory bus 150 utilizes at least a command bus and a data bus, and memory bus 150 supports a read mode for sending data traffic on the data bus from DRAM 170 to memory controller 130. Additionally, memory bus 150 supports a write mode for sending data traffic on the data bus from memory controller 130 to DRAM 170.

Control logic in memory controller 130 determines which one of a read mode and a write mode is a current mode for the data bus in memory bus 150. Each mode has a threshold number of memory access requests to send from the memory controller to the memory device prior to an off-chip data bus turnaround. This threshold number of memory access requests to send is the burst length. When the control logic determines the threshold number of memory access requests have been sent in the current mode, the control logic indicates it is time for a data bus turnaround and changes the current mode to another mode of the read mode and the write mode.

When the control logic determines a threshold number of memory access requests for the current mode have not been sent to the memory device from the memory controller, one of the cost evaluators 138 in memory controller 130 determines a cost for sending remaining requests up to the threshold number in a queue associated with the current mode. To calculate the cost, the cost evaluators 138 determine a weighted sum of at least a number of page conflicts and a number of page misses detected within the remaining number of requests. In various embodiments, the memory device has a default cost for the off-chip data bus turnaround. The cost can be measured in time, such as a number of nanoseconds or a number of clock cycles, or the cost can be converted from a measure of time to another value for comparison to a weighted sum. The cost evaluators 138 compare the calculated cost and the cost of the off-chip data bus turnaround. The comparison is used to determine whether to continue sending the remaining requests in the current mode or terminate the current mode early and then perform the off-chip data bus turnaround.

The off-chip disk memory 162 may provide a non-volatile, random access secondary storage of data. In one embodiment, the off-chip disk memory 162 may include one or more hard disk drives (HDDs). The HDDs typically include one or more rotating disks, each coated with a magnetic medium. These disks rotate at a rate of several thousand rotations per minute. A magnetic actuator is responsible for positioning magnetic read/write devices over the rotating disks. In another embodiment, the off-chip disk memory 162 utilizes a Solid-State Disk (SSD). A Solid-State Disk may also be referred to as a Solid-State Drive. An SSD may emulate a HDD interface, but an SSD utilizes solid-state memory to store persistent data rather than electromechanical devices as found in a HDD. For example, an SSD may comprise banks of Flash memory.

Figure 2:
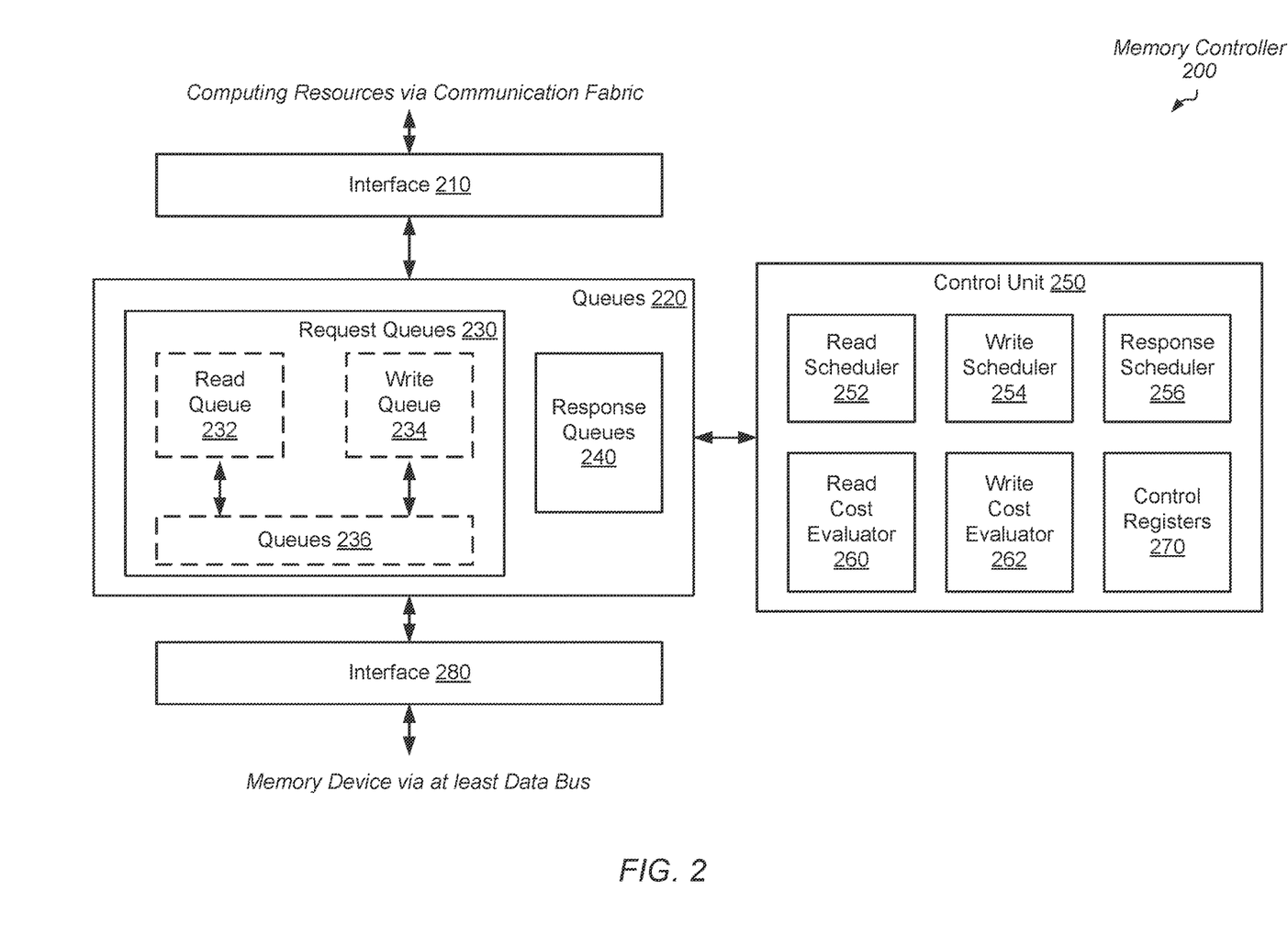
FIG. 2 is a block diagram of one embodiment of a memory controller.

Referring to FIG. 2, a generalized block diagram of one embodiment of a memory controller 200 is shown. In the illustrated embodiment, memory controller 200 includes an interface 210 to computing resources via a communication fabric, queues 220 for storing received memory access requests and received responses, control unit 250 and an interface 280 to a memory device via at least a data bus of a memory bus. Each of interfaces 210 and 280 supports respective communication protocols.

In an embodiment, queues 220 include a read queue 232 for storing received read requests and a separate write queue 234 for storing received write requests. In other embodiments, queues 220 include a unified queue for storing both memory read requests and memory write requests. In one embodiment, queues 220 include queue 236 for storing scheduled memory access requests selected from read queue 222, write queue 234 or a unified queue if one is used.

In some embodiments, read scheduler 252 includes arbitration logic for selecting read requests from the read queue 220 out-of-order. Read scheduler 232 schedules the out-of-order issue of the stored requests within the read queue 220 to the memory device based on a quality-of-service (QoS) or other priority information, age, a process or thread identifier (ID), and a relationship with other stored requests such as targeting a same memory channel, targeting a same rank, targeting a same bank and/or targeting a same page. Write scheduler 254 includes similar selection logic for the write queue 234. In an embodiment, response scheduler 256 includes similar logic for issuing, based on priorities, responses out-of-order to the computing resources, which were received from the memory device.

In some embodiments, control registers 270 store an indication of a current mode. For example, the off-chip memory data bus and memory device support either a read mode or a write mode at a given time. Therefore, traffic is routed in a given single direction during the current mode and changes direction when the current mode is changed after a data bus turnaround latency. In various embodiments, control registers 270 store a threshold number of read requests (read burst length) to send during the read mode. In some embodiments, the control registers 270 also store a write burst length. In some embodiments, the burst length is the same for each of the read mode and the write mode. In other embodiments, two different burst lengths are used for the read mode and the write mode.

When the control logic in the control unit 250 determines a threshold number of memory access requests for the current mode have not been sent to the memory device, one of read cost evaluator 260 and write cost evaluator 262 determines whether it is time to determine a cost for sending remaining requests up to the threshold number. In one example, the current mode is a read mode and the threshold number of requests is 32 read requests. Thus, the read burst length is 32. The memory controller 200 has sent 22 read requests. Therefore, a count maintained by control logic in control unit 250 has been decremented from 32 read requests to 10 read requests. Alternatively, the count has been incremented from 0 read requests to 22 read requests. Read cost evaluator 260 determines it is time to calculate a cost for sending the remaining 10 read requests. Although queues 220 have received more read requests while sending read requests and can store 18 read requests at this time, only the highest priority 10 read requests selected by read scheduler 252 are used for evaluating the cost.

In various embodiments, each of read cost evaluator 240 and write cost evaluator 242 is capable of calculating a cost as a weighted sum of one or more of a number of detected page conflicts, a number of detected page misses, a number of detected switches between ranks of the memory device, and a number of switches between banks of the rank within the remaining number of requests up to the threshold number. Using the above example, read queue 232 has 10 highest priority remaining read requests to send during the read mode. In addition, read cost evaluator 240 detects 3 page conflicts, 2 switches between banks, and 1 switch between ranks within these 10 highest priority remaining read requests. These detected upcoming events are used to determine a cost for sending the 10 remaining read requests.

In some embodiments, the individual cost of each of the detected upcoming events, such as a number of page conflicts, is a measure of time for the latency between two consecutive memory accesses due to the detected parameter. In some embodiments, the measure of time is a number of clock cycles. In other embodiments, each detected event has a respective programmable weight stored in a register of control registers 270. In some embodiments, the cost includes the latency of the access operations. For example, an average latency or a worst-case latency for a read operation for the system memory is used in the weighted sum by read cost evaluator 260. Alternatively, the selected latency is converted to a value to be summed with the weighted values of the detected upcoming events.

For the 10 highest priority remaining read requests in read queue 220 in the above example, the cost of an individual read operation is multiplied by ten or summed ten times along with the weighted values of the detected upcoming events. In an embodiment, control registers 270 also store a cost for the off-chip data bus turnaround. Control logic within control unit 250, such as read cost evaluator 260, compares the cost of the off-chip data bus turnaround to the calculated cost for sending the 10 highest priority remaining requests.

If the cost does not exceed the cost of the off-chip data bus turnaround, then control logic in control unit 250 indicates to the memory controller 200 to continue sending memory read requests from read queue 232 to the memory device. However, if the cost exceeds the cost of the off-chip data bus turnaround, then, in various embodiments, the control logic indicates it is time for a data bus turnaround and changes the mode from the read mode to the write mode. In other embodiments, if the cost exceeds the cost of the off-chip data bus turnaround, then write cost evaluator 262 determines a second cost for sending to the memory device, a number of outstanding write requests up to the threshold number stored in write queue 234. In some embodiments, the second cost is determined in a similar manner as the first cost. In other embodiments, the second cost is determined based on a minimum value of the current number of outstanding write requests and the threshold number of write requests (write burst length).

If the second cost exceeds the cost of the off-chip data bus turnaround, then the control logic in memory controller 200 continues sending memory read requests from read queue 232 until the threshold number is reached. Otherwise, if the second cost does not exceed the cost of the off-chip data bus turnaround, then the control logic indicates it is time for a data bus turnaround and changes the mode from the read mode to the write mode. Accordingly, switching modes is not performed too early to avoid introducing too many off-chip data bus turnarounds. In the above example, the current mode was the read mode and the other mode was the write mode. Similar steps occur when the current mode is the write mode and the other mode is the read mode.

Figure 3:
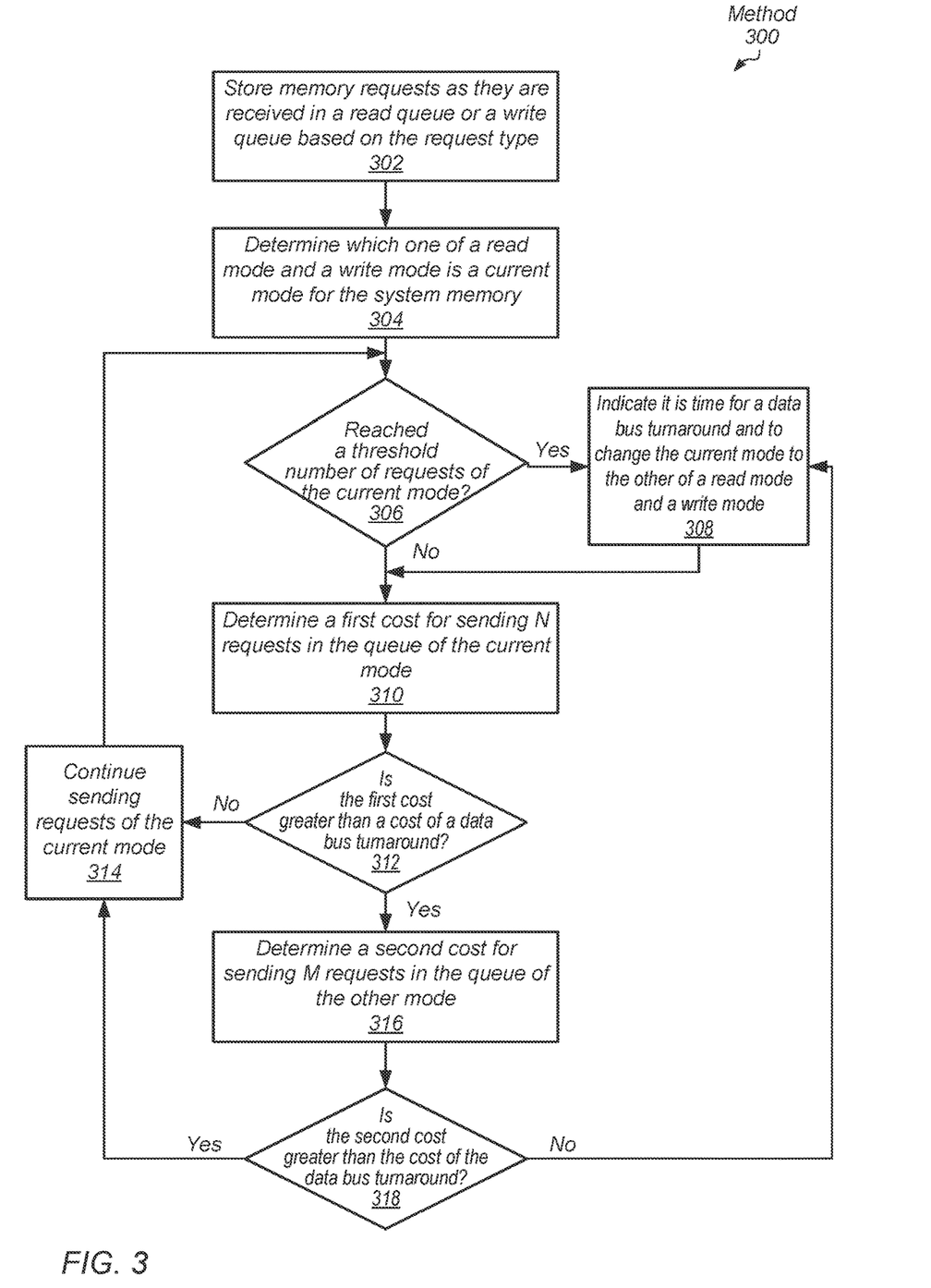
FIG. 3 is a flow diagram of one embodiment of a method for performing efficient memory accesses for a computing system.

Referring now to FIG. 3, one embodiment of a method 300 for performing efficient memory accesses for a computing system is shown. For purposes of discussion, the steps in this embodiment (as well as in FIGS. 4-5) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 300.

One or more computing resources execute computer programs, or software applications. Examples of a computing resource are given earlier. The computing resource determines a given memory access request misses within a cache memory subsystem within the computing resource. The computing resource sends the memory access request to system memory such as DRAM via a memory controller. The memory controller stores memory access requests as they are received in a read queue or a write queue based on the request type (block 302).

The memory controller determines which one of a read mode and a write mode is a current mode for the system memory (block 304). If a threshold number of requests of the current mode is reached ("yes" branch of the conditional block 306), then the memory controller indicates it is time for a data bus turnaround and to change the current mode to the other of the read mode and the write mode (block 308). In some embodiments, a command or other indication is sent from the memory controller to the system memory to indicate the data bus turnaround.

If the threshold number of requests of the current mode is not reached ("no" branch of the conditional block 306), then a first cost is determined for sending requests up to the threshold number in the queue of the current mode (block 310). As described earlier, in various embodiments, the first cost is calculated as a weighted sum of one or more of a number of detected page conflicts, a number of detected page misses, a number of detected switches between ranks of the memory device, and a number of switches between banks of the rank within the requests to send. A page hit occurs when two adjacent scheduled accesses target a same page (row). As the number of page hits increases, the efficiency of accessing system memory increases and the latencies decrease. As the number of page hits increase, the above detected numbers decrease and the cost decreases.

In various embodiments, the number of requests to consider for cost evaluation for the queue associated with the current mode is a difference between the threshold number of requests and a number of requests already sent during the current mode. If the difference is N, where N is a positive integer, then in various embodiments, the next N requests selected by the scheduler associated with the queue are used to evaluate the cost. The next in-order N requests may not be used in these embodiments to evaluate the cost, since the scheduler supports out-of-order issue to the memory device.

If the first cost is not greater than a cost of a data bus turnaround ("no" branch of the conditional block 312), then the memory controller continues sending requests of the current mode (block 314). Afterward, control flow of method returns to the conditional block 306. However, if the first cost is greater than the cost of a data bus turnaround ("yes" branch of the conditional block 312), then, in some embodiments, a second cost is determined for sending requests from the queue associated with the other mode (block 316).

As described earlier, in some embodiments, the second cost is calculated in a similar manner as the first cost. In other embodiments, the second cost is a value converted from a minimum value of the current number of outstanding access requests and the threshold number of access requests (burst length) of an access type not associated with the current mode. If the minimum number is M, where M is a positive integer, then in various embodiments, the next M requests selected by the scheduler are used to evaluate the second cost. If the read mode is the current mode, then the next M write requests selected by the scheduler are used to evaluate the second cost.

Since the scheduler supports out-of-order issue to the memory device, the next in-order M requests may not be used in these embodiments to evaluate the second cost. In one example, if the threshold number of requests for the queue is 32 requests, the queue is capable of storing 64 requests, and currently, the queue is storing 27 outstanding requests, then M is 27. If the queue is currently storing 47 requests, then M is 32, and the 32 requests used for cost evaluation are the 32 requests selected by the scheduler for out-of-order issue to the memory device.

If the second cost is greater than the cost of the data bus turnaround ("yes" branch of the conditional block 318), then control flow of method moves to block 314 where the memory controller continues sending requests of the current mode. Otherwise, if the second cost is not greater than the cost of the data bus turnaround ("no" branch of the conditional block 318), then control flow of method 300 moves to block 308 where the memory controller indicates it is time for a data bus turnaround and to change the current mode to the other of a read mode and a write mode. In yet other embodiments, if the first cost is greater than the cost of the data bus turnaround ("yes" branch of the conditional block 312), then no second cost is used, and control flow of method 300 moves to block 308 where the memory controller indicates it is time for a data bus turnaround and to change the current mode to the other of the read mode and the write mode.

Figure 4:
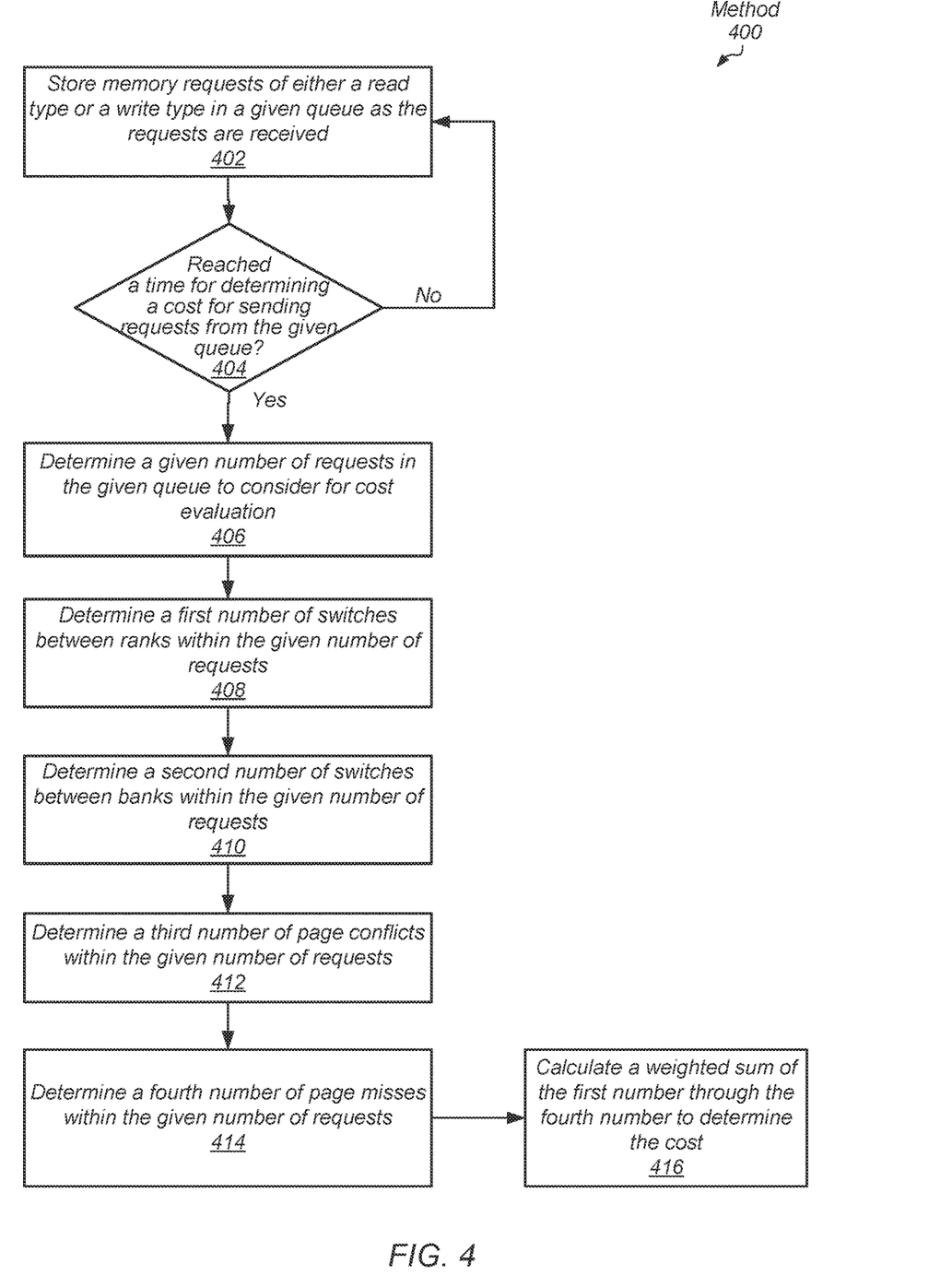
FIG. 4 is a flow diagram of one embodiment of a method for determining a cost for sending remaining requests in a queue.

Referring to FIG. 4, one embodiment of a method 400 for determining a cost for sending remaining requests in a queue is shown. The memory controller stores memory requests of either a read type or a write type in a given queue as the requests are received (block 402). If a time is not reached for determining a cost for sending requests from the given queue ("no" branch of the conditional block 404), then control flow of method 400 returns to block 402. Otherwise, if the time is reached for determining the cost for sending requests from the given queue ("yes" branch of the conditional block 404), then a given number of requests in the given queue to consider for cost evaluation is determined (block 406).

As described earlier, if the queue is associated with the current mode, then the number of requests to consider for cost evaluation for the queue associated with the current mode is a difference between the threshold number of requests and a number of requests already sent during the current mode. If the difference is N, where N is a positive integer, then in various embodiments, the next N requests selected by the scheduler associated with the queue are used to evaluate the cost. However, if the queue is not associated with the current mode, then the number of requests to consider for cost evaluation is the minimum of the threshold number of requests for the queue and the number of requests currently stored in the queue. If the minimum number is M, where M is a positive integer, then in various embodiments, the next M requests selected by the scheduler associated with the queue are used to evaluate the cost.

As described earlier, requests stored in the queue are selected to be sent from the memory controller to the memory device by a scheduler. The scheduler selects the next requests to send based on a variety of factors such as one or more of a quality-of-service (QoS) or other priority information, age, a process or thread identifier (ID), and a relationship with other stored requests such as targeting a same memory channel, a same rank, a same bank and/or a same page, and so forth. When the given number of requests to consider for cost evaluation is determined, a first number of switches between ranks within the given number of requests is determined (block 408).

A second number of switches between banks within the given number of requests is determined (block 410). A third number of page conflicts within the given number of requests is determined (block 412). A fourth number of page misses within the given number of requests is determined (block 414). A weighted sum of the first number through the fourth number is calculated to determine the cost (block 416).

Figure 5:
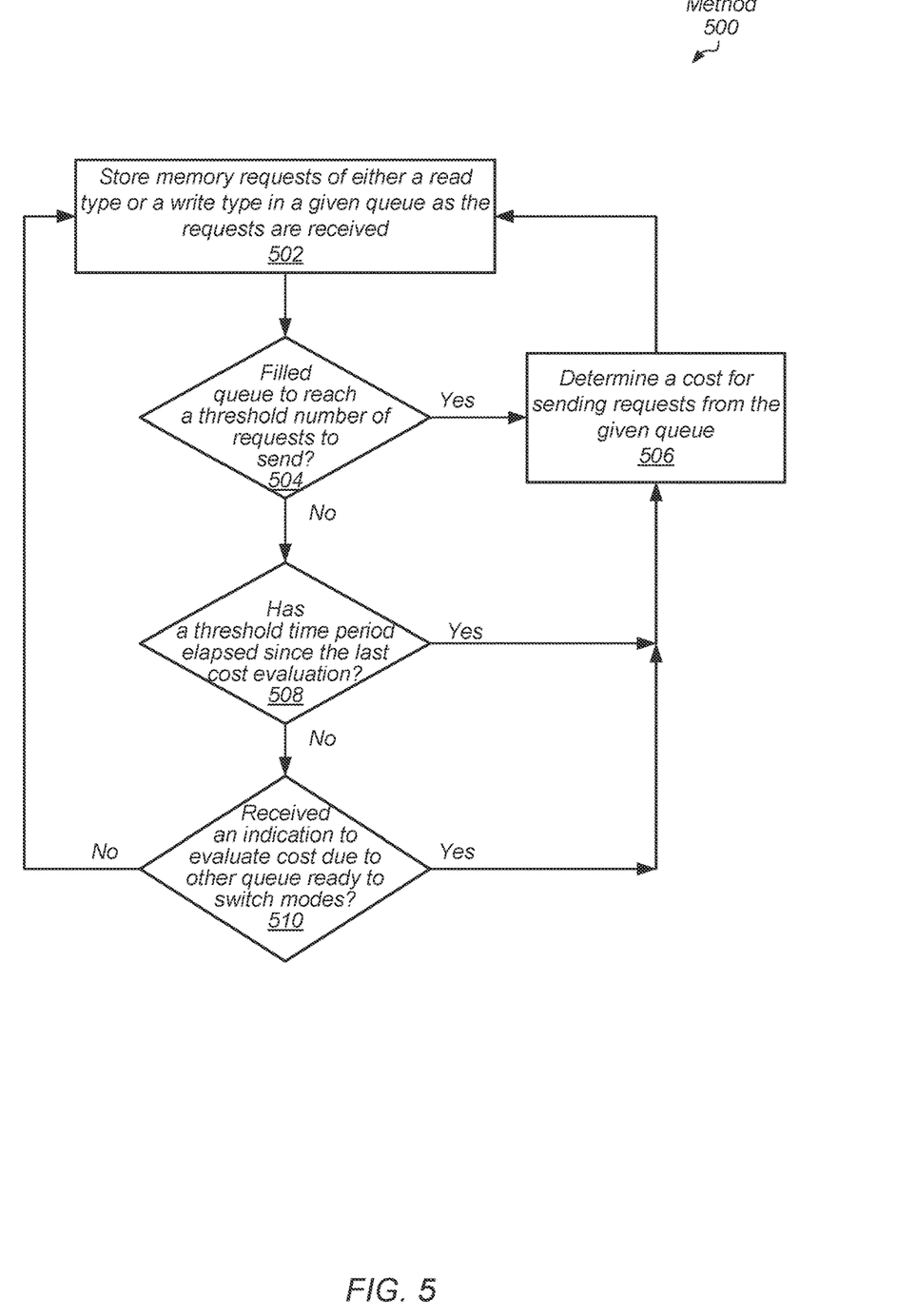
FIG. 5 is a flow diagram of one embodiment of a method for determining a time to calculate a cost for sending remaining requests in a queue.

Turning now to FIG. 5, one embodiment of a method 500 for determining a time to calculate a cost for sending remaining requests in a queue is shown. The memory controller stores memory requests of either a read type or a write type in a given queue as the requests are received (block 502). If a given queue is filled to reach a threshold number of requests to send during a corresponding mode ("yes" branch of the conditional block 504), then a cost for sending requests from the given queue is determined (block 506).

If the number of filled entries in the given queue has not reached the threshold number of requests to send during the corresponding mode ("no" branch of the conditional block 504), but a threshold time period has elapsed since the last cost evaluation ("yes" branch of the conditional block 508), then the cost for sending requests from the given queue is determined (block 506). If the threshold time period has not elapsed since the last cost evaluation ("no" branch of the conditional block 508), and an indication is not received to evaluate cost, such as if it has been detected that the other queue is ready to switch from the current mode ("no" branch of the conditional block 510), then control flow of method 500 return to block 502. Otherwise, if an indication is received to evaluate cost ("yes" branch of the conditional block 510), then control flow of method 500 moves to block 506. In such a case, control logic determined the cost to send the remaining requests in the other queue up to the threshold number of requests is greater than the cost of the data bus turnaround. Before the data bus turnaround is initiated, the cost of this queue is requested to be known.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A memory controller comprising:
a plurality of queues comprising circuitry configured to store memory access requests; and
control circuitry configured to:
send one or more first memory access requests stored in a first queue of the plurality of queues; and
send memory access requests stored in a second queue of the plurality of queues subsequent to the one or more first memory access requests having been sent, responsive to:
a cost for sending second memory access requests stored in the first queue being greater than a threshold cost; and
a cost for sending the memory access requests in the second queue being less than the threshold cost.

2. The memory controller as recited in claim 1, wherein in response to the first queue not storing at least a threshold number of memory access requests, the control circuitry is configured to calculate whether a given period of time has elapsed since a most recent cost evaluation was performed.

3. The memory controller as recited in claim 2, wherein:
the threshold cost is a cost of a data bus turnaround of an off-chip data bus; and
the threshold number of memory access requests corresponds to a burst length of a memory device.

4. The memory controller as recited in claim 3, wherein the cost for sending the memory access requests stored in the second queue corresponds to a cost for sending requests according to a mode for the off-chip data bus different from a current mode for the off-chip data bus.

5. The memory controller as recited in claim 1, wherein in response to the first queue not storing at least a threshold number of memory access requests and a given period of time has elapsed since a most recent cost evaluation was performed, the control circuitry is configured to calculate the cost for sending the second memory access requests.

6. The memory controller as recited in claim 1, wherein the second memory access requests are read requests, and the memory access requests other than the second memory access requests are write requests.

7. The memory controller as recited in claim 1, wherein the cost for sending the second memory access requests is based on at least one of a number of page conflicts and a number of page misses.

8. The memory controller as recited in claim 2, wherein the control circuitry is further configured to send the memory access requests of the threshold number of memory access requests stored in the first queue, instead of the memory access requests stored in the second queue, responsive to the cost for sending the second memory access requests being greater than the threshold cost.

9. A method for use in a computing system, the method comprising:
   storing, by a memory controller, received memory access requests in a plurality of queues;
   sending, by the memory controller, one or more first memory access requests stored in a first queue of the plurality of queues;
   sending, by the memory controller, memory access requests stored in a second queue of the plurality of queues subsequent to the one or more first memory access requests having been sent, responsive to:
      a cost for sending second memory access requests stored in the first queue being greater than a threshold cost; and
      a cost for sending the memory access requests in the second queue being less than the threshold cost.

10. The method as recited in claim 9, further comprising calculating whether a given period of time has elapsed since a most recent cost evaluation was performed, in response to the first queue not storing at least a threshold number of memory access requests.

11. The method as recited in claim 10, further comprising calculating the cost for sending the second memory access requests, in response to the first queue not storing at least the threshold number of memory access requests and a given period of time has elapsed since a most recent cost evaluation was performed.

12. The method as recited in claim 9, wherein the second memory access requests are read requests, and the memory access requests stored in the second queue are write requests.

13. The method as recited in claim 10, wherein:
   the threshold cost is a cost of a data bus turnaround of a memory device; and
   the threshold number of memory access requests corresponds to a burst length of the memory device.

14. The method as recited in claim 13, wherein to the cost of sending the second memory access requests at based on at least one of a number of page conflicts and a number of page misses.

15. The method as recited in claim 10, further comprising sending the second memory access requests of the threshold number of memory access requests stored in the first queue, instead of the memory access requests stored in the second queue, responsive to the cost being less than the threshold cost.

16. The method as recited in claim 13, wherein the cost for sending the memory access requests stored in the second queue corresponds to a cost for sending requests according to a mode for an off-chip data bus different from a current mode for the off-chip data bus.

17. A computing system comprising:
   a memory device configured to store data;
   one or more computing resources, each configured to generate memory access requests for the data; and
   a memory controller, comprising a plurality of queues, coupled to the memory device via a data bus;
   wherein the memory controller, is configured to:
      send one or more first memory access requests stored in a first queue of the plurality of queues; and
      send memory access requests stored in a second queue of the plurality of queues subsequent to the one or more first memory access requests having been sent, responsive to:
         a cost for sending second memory access requests stored in the first queue being greater than a threshold cost; and
         a cost for sending the memory access requests in the second queue being less than the threshold cost.

18. The computing system as recited in claim 17, wherein in response to the first queue not storing at least a threshold number of memory access requests, the memory controller is configured to wait until a given period of time has elapsed before performing a cost evaluation.

19. The computing system as recited in claim 18, wherein in response to the first queue not storing at least the threshold number of memory access requests and a given period of time has elapsed since a most recent cost evaluation was performed, the memory controller is configured to calculate the cost for sending the second memory access requests.

20. The computing system as recited in claim 17, wherein the second memory access requests are read requests, and the memory access requests stored in the second queue are write requests.

* * * * *